(12) United States Patent
Hedges et al.

(10) Patent No.: US 11,820,163 B1
(45) Date of Patent: *Nov. 21, 2023

(54) METHODS OF MAKING SURFACE MATERIALS WITH EMBEDDED IMAGES

(71) Applicants: Nicholas Louis Hedges, Bristol, IN (US); Chad William Wood, Elkhart, IN (US)

(72) Inventors: Nicholas Louis Hedges, Bristol, IN (US); Chad William Wood, Elkhart, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/933,612

(22) Filed: Sep. 20, 2022

Related U.S. Application Data

(63) Continuation of application No. 16/674,157, filed on Nov. 5, 2019, which is a continuation of application No. 16/023,760, filed on Jun. 29, 2018, now abandoned.

(51) Int. Cl.
| | | |
|---|---|---|
| *B41M 5/00* | (2006.01) | |
| *B41M 7/00* | (2006.01) | |
| *B41M 3/06* | (2006.01) | |
| *B44F 7/00* | (2006.01) | |
| *B44F 9/04* | (2006.01) | |
| *B44C 3/02* | (2006.01) | |
| *B41F 23/04* | (2006.01) | |

(52) U.S. Cl.
CPC .............. *B41M 5/007* (2013.01); *B41M 3/06* (2013.01); *B41M 7/0027* (2013.01); *B41M 7/0036* (2013.01); *B44C 3/025* (2013.01); *B44F 7/00* (2013.01); *B44F 9/04* (2013.01); *B41F 23/0409* (2013.01); *B41M 2205/42* (2013.01)

(58) Field of Classification Search
CPC ...... B41M 5/007; B41M 3/06; B41M 7/0027; B41M 7/0036; B41M 2205/42; B44C 3/025; B44F 7/00; B44F 9/04; B41F 23/0409
See application file for complete search history.

(56) References Cited

U.S. PATENT DOCUMENTS

| | | |
|---|---|---|
| 3,975,561 A | 8/1976 | Knudson et al. |
| 4,198,457 A | 4/1980 | Saito et al. |
| 4,209,486 A | 6/1980 | Ross |
| 4,219,598 A | 8/1980 | Noma et al. |
| 4,226,933 A | 10/1980 | Ishizawa et al. |
| 4,554,118 A | 11/1985 | Seifert |
| 4,716,672 A | 1/1988 | Arakawa |
| 4,871,503 A | 10/1989 | Ishii et al. |
| 4,946,715 A | 8/1990 | Avera |

(Continued)

*Primary Examiner* — James M Mellott
(74) *Attorney, Agent, or Firm* — Woodard, Emhardt, Henry, Reeves & Wagner, LLP

(57) ABSTRACT

The disclosure relates to methods of manufacturing surface materials for construction or manufacturing use and the surface materials produced by such methods. Substrate materials, such as synthetic or engineered stone or fiber-reinforced resinous panels, can be formed in conventional ways such as casting, molding, or pressing. Layers are printed onto substrate materials to form textures, which may include inks to selectively color the printed texture, thereby enabling a wide variety of high-resolution appearances. A clear, protective topcoat is then applied to the surface materials and cured to provide a finished material.

20 Claims, 7 Drawing Sheets

(56) References Cited

U.S. PATENT DOCUMENTS

| | | | |
|---|---|---|---|
| 5,034,084 A | 7/1991 | Schafer et al. | |
| 5,093,157 A | 3/1992 | Miyamoto | |
| 5,164,127 A | 11/1992 | Boeckeler | |
| 5,167,991 A | 12/1992 | Lowe | |
| 5,328,730 A | 7/1994 | Lowe | |
| 5,916,502 A | 6/1999 | Niwa et al. | |
| 5,916,662 A | 6/1999 | Schmidt | |
| 6,114,008 A | 9/2000 | Eby et al. | |
| 6,329,040 B1 | 12/2001 | Oshima et al. | |
| 6,465,046 B1 | 10/2002 | Hansson et al. | |
| 6,686,315 B1 | 2/2004 | Creed | |
| 6,888,147 B1 | 5/2005 | Hansson et al. | |
| 8,703,279 B2 | 4/2014 | Fukada et al. | |
| 9,216,610 B2 | 12/2015 | Schacht et al. | |
| 9,278,577 B2 | 3/2016 | Hicks | |
| 2002/0081398 A1 | 6/2002 | Bennett et al. | |
| 2005/0227006 A1 | 10/2005 | Segall | |
| 2006/0182975 A1 | 8/2006 | Burbank et al. | |
| 2006/0293449 A1* | 12/2006 | Weberg | C04B 26/14 525/107 |
| 2009/0143519 A1* | 6/2009 | Catel | C04B 26/18 524/425 |
| 2011/0104451 A1 | 5/2011 | Yaniv et al. | |
| 2011/0268937 A1 | 11/2011 | Schacht et al. | |
| 2014/0053484 A1 | 2/2014 | Hansson et al. | |
| 2014/0331585 A1* | 11/2014 | Morneau | B29C 70/305 156/196 |
| 2015/0024166 A1 | 1/2015 | Bilodeau | |
| 2019/0099915 A1* | 4/2019 | Adams | C04B 40/0067 |

\* cited by examiner

METHODS OF MAKING SURFACE MATERIALS WITH EMBEDDED IMAGES

CROSS-REFERENCE TO RELATED APPLICATION

The present application is a continuation of U.S. patent application Ser. No. 16/674,157, filed Nov. 5, 2019, entitled "Methods of Making Surface Materials with Embedded Images", which is a continuation of U.S. patent application Ser. No. 16/023,760, filed Jun. 29, 2018, entitled "Methods of Making Surface Materials with Embedded Images", which are hereby incorporated by reference.

BACKGROUND

Surface materials are used in a wide variety of construction and manufacturing settings. For example, residential and commercial construction projects use fabricated countertops, shower panels, or tiles made from synthetic or cultured stone materials. Surface materials may also be composite materials, for example, fiber-reinforced resinous panels used, for example, in vehicle body panels. Because of the wide variety of uses for these materials and the varying aesthetic and/or design preferences of users, it is necessary to manufacture surface materials with different appearances and textures.

For example, FIG. 1 is a block diagram of exemplary manufacturing processes 100 for engineered stone surface materials implemented in the prior art. In a first step 101, molds are prepared. The standard preparation is to pour a clear resin or gel coat into a mold. Eventually, that clear coat will become the top, outer layer in the finished material when the product is de-molded and inverted. The remaining layers of the material are added to the inner surface of the gel coat. In one example, images are applied to the inner surface of the gel coat in step 103. Common image applications include painting, use of transfer films, sublimation inks, and/or digital printing. After that, the substrate material is backfilled into the mold in step 105. After curing 107, the surface material can be subjected to various finishing processes 109, such as polishing, grinding, buffing, cutting, and/or trimming. Some known processes do not apply imaging in a separate layer, but rather create an appearance effect in the step 105 of backfilling the substrate. Examples of this include mixing of different colored resins to create marbling, mottled, striated, or other natural appearances.

FIG. 2 is a block diagram of exemplary manufacturing processes 200 for certain fiber-reinforced panels implemented in the prior art. Panels are prepared 201 by various known methods, for example by submerging glass or mineral fibers in a resin which is then molded or pressed to produce a raw panel material. The raw panel material may require surface finishing 203 including treatments similar to step 109 described above. Surface finishing 203 may also include the application of different or additional resin materials or other coatings to the surface intended for exposure. Images in manufacturing processes 200 are typically applied through either hand-painting, which may include multiple intermediate masking and drying steps, or the application of adhesive decals. Accordingly, processes 200 include the additional steps of preparing the art materials 205 and applying images 207. Further surface processing, such as additional coatings, curing, or finishing may also be required in additional steps (not shown). Although the ordering is somewhat different, the steps of processes 200 have some conceptual overlap with the steps of processes 100.

The processes 100, 200 described above have significant labor requirements. For example, the application of images 103, 207, may require hand-painting images or manual mixing of dyed substrate resins. To the extent such processes can be automated, they may be subject to practical limitations on size and/or quality (i.e., transfer films, printer beds, mechanical mixing). Materials made according to processes 100, 200 may have unsatisfactory finished appearances. For example, the gel coat on an engineered stone may appear cloudy and render the underlying image blurry or indistinct, regardless of the quality and resolution of the image application step 103. Additionally, the use of mixed image materials, such as paints or decals applied to an underlying substrate, may provide for inconsistent wear or fading of one layer of the surface material relative to another. This problem is especially problematic where the finished materials are exposed to sunlight and other outdoor elements, such as in vehicle panels and, in particular, vehicles that are stored outdoors such as recreational vehicles. The methods and materials disclosed herein address these and other problems.

BRIEF SUMMARY OF THE INVENTION

The present disclosure provides for the manufacturing of surface materials in various ways. In one embodiment, a substrate surface is provided which may include a raw surface. Textures and images are printed onto the substrate, and a coating layer is applied and cured to form a finished surface material. The substrate surface may be molded without the use of a gel coat lining the mold, thereby enhancing the adhesion and appearance of the printed textures and images. Curing the printed layers may diffuse the texture and images into the substrate layers to provide enhanced appearances and/or other visual effects. The composition of the substrate layer may be optimized for use in these processes.

In some embodiments, the texture layers include multiple discrete tile sections separated by depressions. The depressions may expose the underlying substrate surface to form part of the appearance, such as a contrasting color border between different tile sections or groups of tile sections. The tile sections may have substantially the same or similar dimensions and/or substantially the same or similar surface features and appearances. Materials produced according to the processes described herein may have additional advantages as described in relation to particular embodiments as described further herein.

DETAILED DESCRIPTIONS

Figure 3:
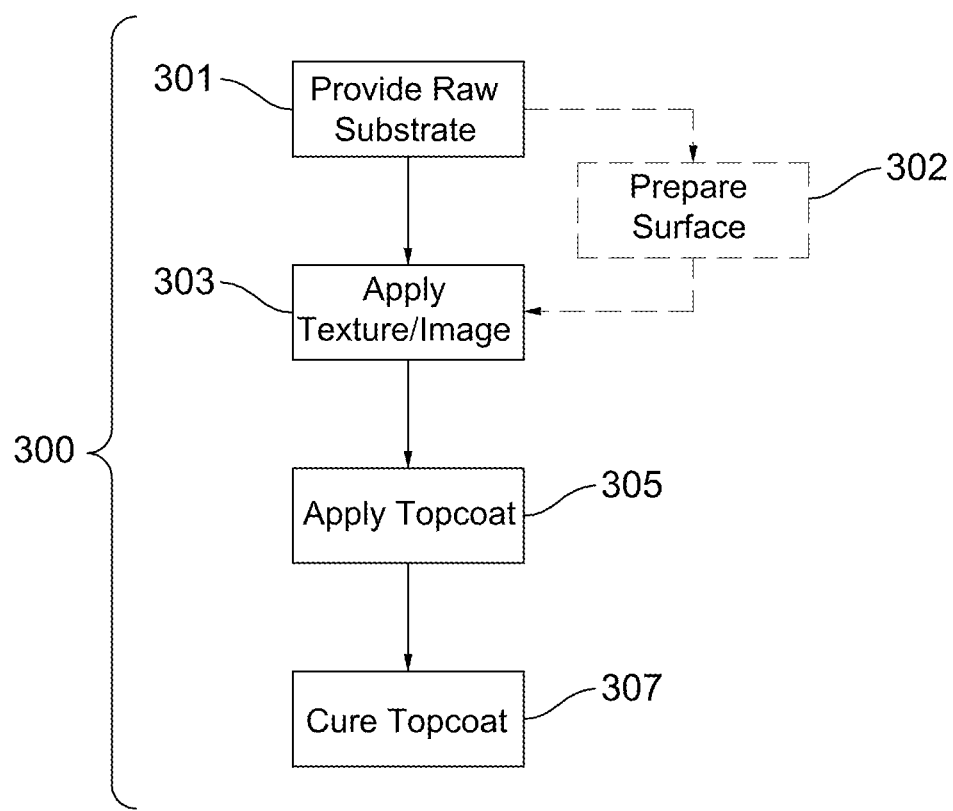
FIG. 3 is a block diagram of inventive processes for manufacturing surface materials with embedded images.

FIG. 3 illustrates inventive processes 300 for manufacturing surface materials with embedded images. Raw substrate surfaces are provided in step 301. Exemplary raw substrate surfaces may be engineered stone surfaces, such as panels or slabs. As used herein, "engineered stone" refers to and includes all manner of synthetic materials mimicking the appearance and properties of quarry products, e.g., cultured marble, cultured onyx, cultured granite, cultured quartz, composite stone, solid surface, agglomerate or agglomerated stone. Engineered stone is typically produced by a mixture of ground quarry materials, i.e., stone products, with a polymer resinous binder and a catalyst. Traditional engineered stone products are prepared by mixing, by weight, about 75% powdered stone, about 25% liquid polymer resin, and about 1% of curing catalyst. Pigments may be included in engineered stone materials, as is known to those of ordinary skill in the art. For example, titanium oxide may be added to provide a white color to the substrate. Engineered stone surfaces may be provided as a raw surface material, i.e., with an unfinished surface that is rough and/or not protected by a coating layer(s). For example, an engineered stone product may be produced by pouring a base mixture into a mold, curing the base mixture to form the substrate surface, and removing the substrate from the mold. In contrast to the prior art, the methods disclosed herein may use molded substrate surfaces that are produced in a process wherein the mold is not lined with a gel coating when pouring the base mixture. Thus, manufacturing and material costs may be reduced. Typical engineered stone substrate surfaces as described herein will be approximately one-eighth (⅛) to 1 inch thick, with particular dimensions selected based upon the intended end use for the finished product. For example, an engineered stone shower panel will typically be about one-quarter to three-eighths of an inch thick, or up to one-half inch thick. Depending on thickness and stone choices, the substrate panel may be at least partially translucent. For example, a cultured onyx substrate panel about one-quarter inch thick may be provided when the finished installation is intended to be backlit.

In a preferred form, the mold surface is a smooth, horizontal glass tabletop with removable borders. An inventive engineered stone composition compatible with the methods herein is prepared by mixing, by weight, about 67% ground stone, about 32.5% resin, and less than about 0.5% catalyst. For example, 124 pounds of Marfill 40 (R.J. Marshall Company, Southfield, Michigan) may be combined with 60 pounds of marble casting resin (SILMAR SIL90BA-585, Interplastic Corp., St. Paul, Minnesota) and about 50 cc of curing catalyst, for example Organic Peroxide Type D Liquid (UN3105). As discussed above, a standard engineered stone mixture would have a greater percentage of ground stone and a significantly larger amount of catalyst, on the order of 500 cc. One or more pigments may be added to the base mixture. After pouring in the base mixture, the mold surface is vibrated and then the substrate mixture cures, typically for a period of about 10 minutes to about an hour. Curing time can be adjusted by using more or less catalyst in the base mixture. After curing, the substrate surface is removed from the mold for further processing. In another embodiment, in contrast to a smooth, flat table, the mold surface may have a variable texture which provides a predetermined surface texture to the cast substrate surface after curing and de-molding. Nonetheless, preferred methods cast in a smooth mold, particularly when a gel coat is not used to pre-coat the mold.

Step 302 includes optional surface preparation processes. For example, the substrate surface can be sanded or abraded to alter the raw finish from the mold. Modifications to the surface finish prior to the following manufacturing steps can provide different visual appearances to the finished product. For example, a roughened surface prior to imaging and topcoating (discussed below) may provide or enhance a dull or matte final surface appearance. A rougher substrate may also provide for better adhesion of inks during printing and curing as discussed below. Substrate surfaces can be also be prepared by cutting panels to size and/or modifying edges. For example, for a three-walled shower enclosure, a single substrate panel can be removed from the mold, cut into three sections, and the edges can be mitered and/or beveled to facilitate later installation and attachment of the sections.

In step 303, textures and/or images are applied to the substrate surface. Preferably, step 303 includes the use of digital printing or plotting. Textures and images may be applied at the same time or in sequential steps, depending on the desired finished appearance. For example, referring briefly to FIGS. 6-7, printing inks may be layered to form a texture 603 on the substrate surface 605. These same printing inks can have suitable pigmentation and coloring, such that texture layer 603 is colored throughout its entire depth. Alternatively, texture layers 603 may be printed with one (or more) color(s) of ink, followed by printing of the desired surface image with further inks of the various colors needed to achieve the desired finished appearance. In one embodiment, inks are applied in layers to form texture 603 by multiple passes of a printer head. For example, eight passes or applications of ink may provide a texture/image layer approximately one-sixteenth of an inch thick on top of the substrate surface. Inks suitable for both of these options are commercially available.

Preferably, inks are rapidly curable by exposure to ambient air (i.e., drying) and/or application of energy such as ultraviolet (UV) light. An unexpected result and advantage of the combination of such inks and substrates is that the inks may be printed directly onto the uneven surfaces of a raw substrate surface without the use of intermediate layers such as primers or intermediate steps such as sanding, grinding, or polishing. The intensity of the UV curing may be adjusted depending on factors such as (but not limited to) the composition and thickness of the ink and/or substrate layers, and/or ambient conditions (temperature, humidity, etc.). In some embodiments, UV curing is applied to raise the temperature at the surface of the substrate and ink layers to about 95-105° Fahrenheit. UV curing the inks may also provide additional reactions with the underlying substrate, such that the image/texture layers diffuse into and/or adhere to the substrate surface. UV curing may be provided simultaneously with the application of ink layers. Alternatively, UV curing may be performed subsequent to application of various ink layers as a distinct manufacturing step.

Figure 1:
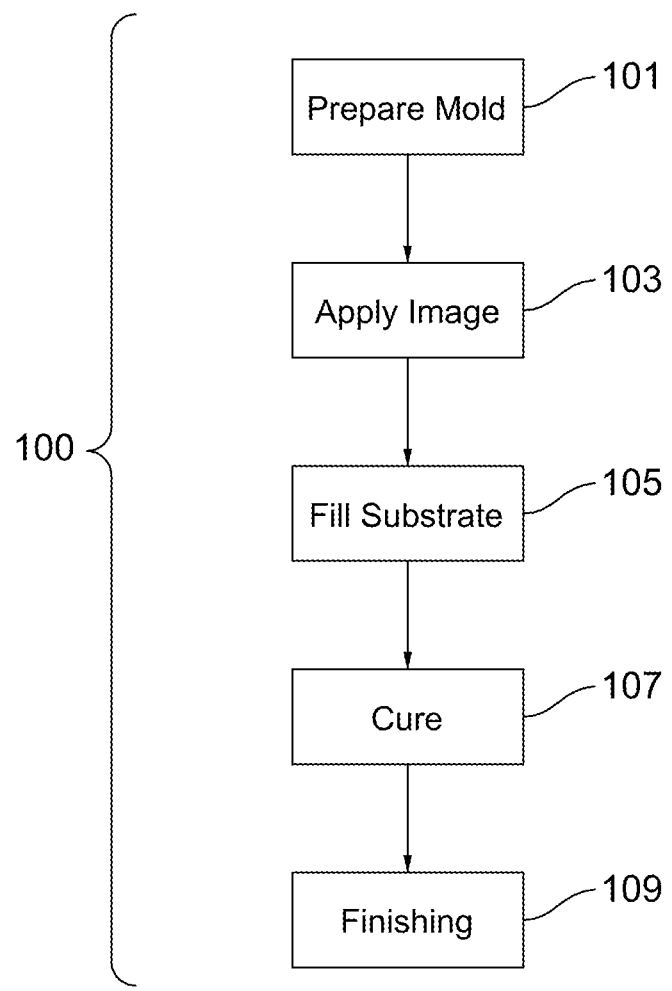
FIG. 1 is a block diagram of exemplary manufacturing processes for engineered stone surface materials implemented in the prior art.
Figure 2:
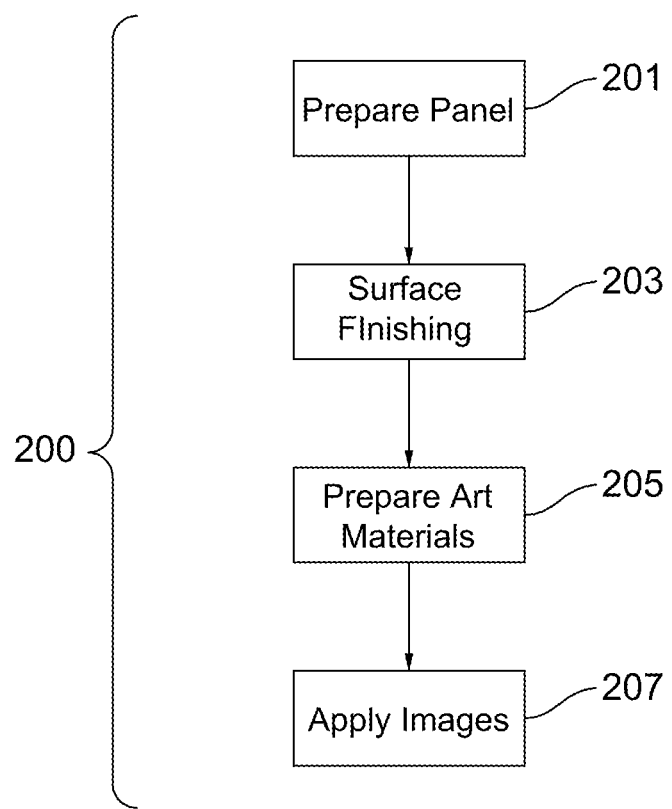
FIG. 2 is a block diagram of exemplary manufacturing processes for fiber-reinforced surface materials implemented in the prior art.

Digital printing in step 303 provides several advantages over prior art processes such as painting, transfer films, or mixing pigmented base materials as described in connection with FIG. 1, above. A substantial advantage is provided by the fact that the texture/image is not applied while the material is in the mold. Thus, customized equipment, that can reach down into the constricted environment of a mold is not required. Instead, the printer head can operate with freedom of movement over a flat table supporting the substrate surface. Alternatively, a fixed linear print system can be employed over a moving table that manipulates the positioning and/or orientation of substrate surface. Flat printing also permits larger sizes of panels/surfaces to be processed. For example, surfaces having dimensions of approximately 10 feet by 6 feet (118 inches by 77 inches) have been printed according to the methods described herein. A further advantage relative to prior in-mold imaging is that flatbed digital printing can extend to the entire substrate surface, up to and including the edge of the material, especially in the case of surface panels with mitered edges. In a gel-coated mold technique such as in FIG. 1, the vertical edge of the substrate is established after, and on top of, the image layer, such that the appearance of the edge cannot be substantially modified from the inherent appearance of the base engineered stone mixture.

Digital printing also provides precise, high resolution image applications that differ from the prior art. Virtually any appearance source may be reproduced accurately through digital printing on the substrate surface, including (but not limited to) natural materials (e.g., stones, other quarried materials, wood or plant images, etc.), synthetic surface materials (e.g., tiles, stampings, etc.), artwork, and/or text. Millions of colors may be derived from the same set of inks, at substantially the same complexity as a restricted palette from a handful of pigments mixed in prior art molding processes. Precise color matching to complementary or preexisting products or images, such as natural products or other decorative finishes, is also possible. In an application involving multiple individual panels, individual images can be selected and precisely printed on each individual panel such that the individual images will mate or complement each other in a finished installation. For example, a shower panel assembly can be printed so that an overall image spans multiple panels, including wrapping around corners. Printing also reduces the manufacturing complexity and potential for error relative to processes which include additional materials and steps, such as transfer films and mixing materials within the mold.

Upon completion of step 303 and curing of the ink(s), surface materials may be at least partially water-resistant and, in some embodiments, suitable for use as a finished product in some construction applications. However, many embodiments include additional processing to further protect the image and texture layer(s).

Returning to FIG. 3, upon suitable curing of the texture and/or image layers, a topcoat is applied to the surface material in step 305. Preferably topcoat 607, 707 (see FIGS. 6-7) is a resinous coating. The topcoat may be applied in various ways including (but not limited to) pouring, spraying, brushing, curtain coating, and/or roll coating, either manually or with automation. Topcoat may be a polymer resin, similar to the gel coats used to line molds in traditional manufacturing of engineered stones. In some embodiments, the topcoat is an acrylic urethane, such as a glossy automotive finish (R-M DC5335 Glamour Clear, BASF).

In curing step 307, topcoat is cured to provide a hard, impermeable layer on one side of the surface material. Cured topcoats are rigid but maintain sufficient flexibility to withstand handling and installation without cracking, marring, or other blemishes. Preferably, topcoat, upon curing, is clear, transparent, or translucent, although varying opacities or tinting may be used if desired. The cured topcoat provides resistance to scratching, light, weathering, and water. Curing 307 may performed in various ways, such as heating, drying, or radiation, depending on the material chosen for the topcoat layer. Curing step 307 may bond topcoat to both image/texture layers(s) and the substrate surface. Topcoats compositions may be compatible with the ink(s) of the image/texture layer(s) such that curing 307 of the topcoat does not react with the ink(s) or otherwise degrade the appearance of the image/texture. Upon completion of curing 307, the finished materials may have enhanced appearances relative to traditionally-manufactured surfaces described above in connection with FIG. 1.

Figure 4:
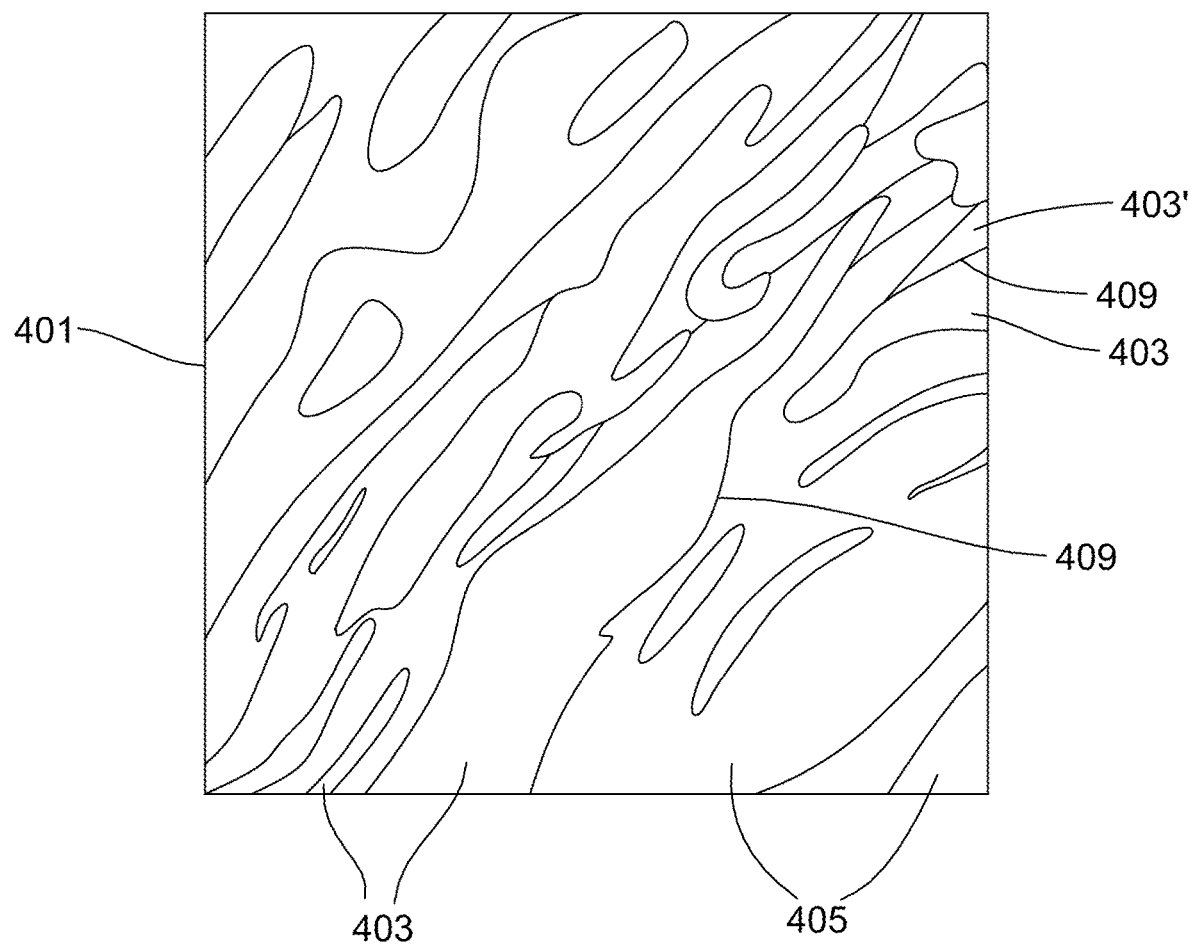
FIG. 4 is an exemplary top view of a finished surface material created by the inventive processes of FIG. 3.

FIG. 4 is an exemplary top view of a finished surface material 401 created by the processes 300 of FIG. 3. As seen in FIG. 4, the material 401 may have a marbled or granitic appearance mimicking a natural stone product. For example, first sections 403 may have a first appearance layer applied, while second sections 405 may have a second appearance layer applied. The first appearance layer and second appearance layers may comprise the same or different colors, patterns, textures, and/or images. For example, first sections 403 may have a grainy appearance of a particular mix of first colors, while second sections 405 may have a similar grainy appearance comprising a different set of colors. In another example, the grain size between first and second appearance layers may be substantially different even if printed from the same or similar color palettes. Furthermore, the first and second appearance layers may have differing depths or texture effects, in addition to or instead of the foregoing options. Boundaries 409 may separate first sections 403 and second sections 405. Boundaries 409 may also be discernible between two instances 403, 403' of first sections that are otherwise similar in appearance. Although one particular configuration is shown in FIG. 4, the principles are applicable to the application of various images to a substrate surface and the production of various finished products.

Figure 5:
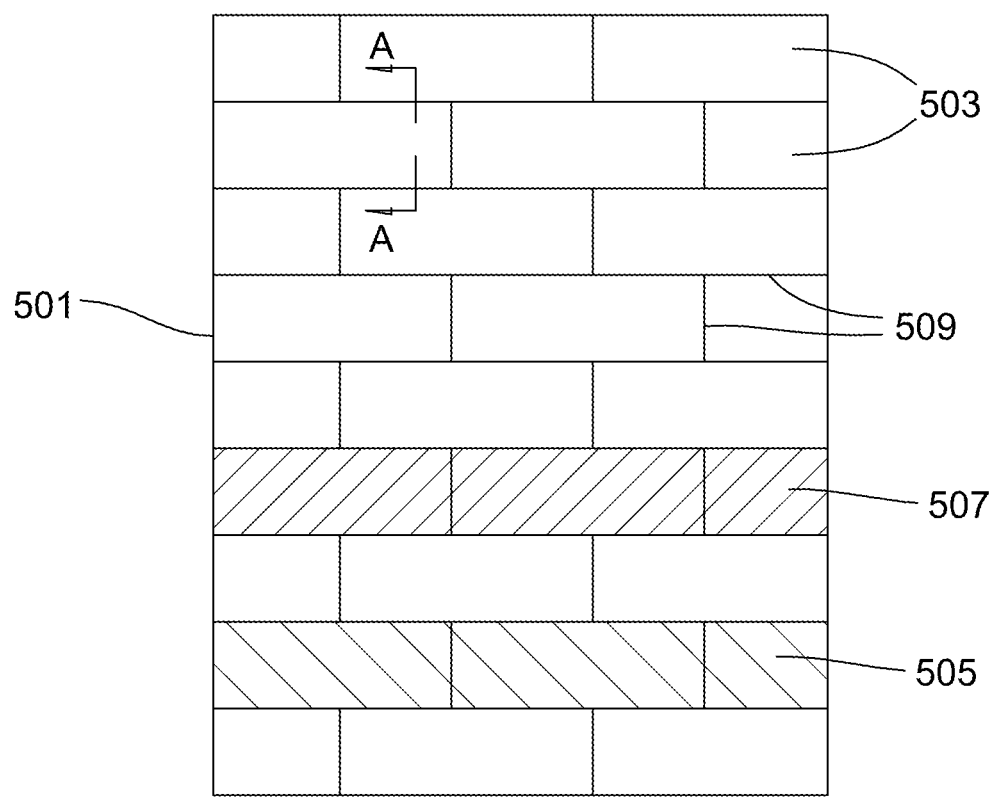
FIG. 5 is an exemplary top view of an alternative finished surface material created by the inventive processes of FIG. 3.

FIG. 5 is an exemplary top view of an alternative finished surface material 501 created by the processes of FIG. 3. In FIG. 5, the texture layer has multiple discrete tile sections 503 separated by depressions 509. Additional types of tile sections 505, 507 may be printed. As with first and section sections 403, 405 described above, discrete tile sections 503, 505, 507 may comprise the same or different colors, patterns, textures, and/or images. Additionally, tile sections 503, 505, 507 may have the same or substantially the same dimensions, or the tiles within an individual section, for example tile section 503, may have the same or substantially the same dimensions. Again, the complexity of the pattern is not limited by the printing and fabrication process, so the layout and arrangement options are not limited to the configuration of three types 503, 505, 507 of tile sections as shown in FIG. 5. The appearance of separation or depressions 509 can be printed in a differing color or texture, rather than a physical gap or difference in layer thickness, similar to that of boundaries 409 described above. Alternatively, depressions 509 may expose the substrate surface material, such that the substrate is visible through the cured coating layer and contributes to the appearance of the finished surface material. For example, depressions 509 may expose a substrate material that has the color or appearance similar to a mortar or grout line in a traditional tile installation. The substrate material visible through depressions 509 may provide contrasting color border between different tile sections 503 or groups 503, 505, 507 of tile sections.

Figure 6:
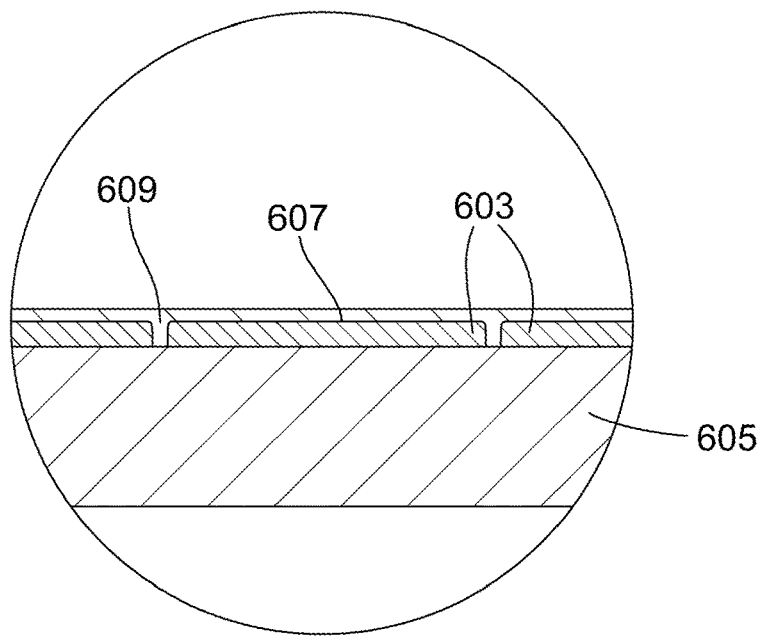
FIG. 6 is a cutaway view of a surface material created by the inventive processes of FIG. 3, such as along the line A-A in FIG. 5.
Figure 7:
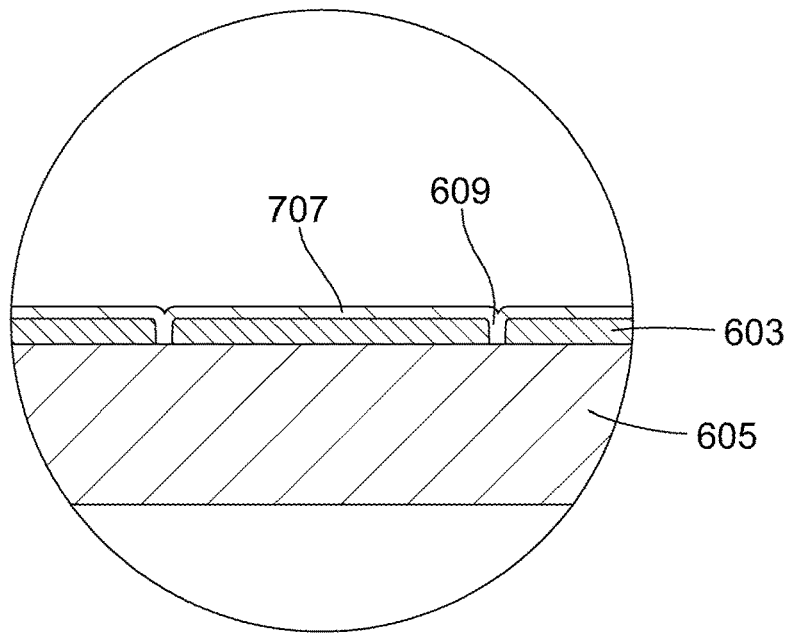
FIG. 7 is a cutaway view of an alternative surface material created by the inventive processes of FIG. 3, such as along the line A-A in FIG. 5.

FIG. 6 is a cutaway view of a surface material created by the processes of FIG. 3, such as along the line A-A in FIG. 5. As seen in FIG. 6, substrate 605 supports the texture layer 603. As with tile sections 503 described above, portions of the texture layer(s) 603 may be separated by depressions 609. Depressions 609 may expose the substrate 605 to be visible in the finished product. Topcoat 607 is applied on top of texture layer(s) 603. A seen in FIG. 6, topcoat 607 has a surface that is level even when the layers beneath it are uneven, for example in the area of depressions 609, such that the finished product has a uniform thickness. FIG. 7 is a cutaway view of an alternative surface material created by the inventive processes of FIG. 3, such as along the line A-A in FIG. 5, and identical to FIG. 6 except for the configuration of topcoat 707. Topcoat 707 is applied in an approximately uniform thickness over the underlying layers, such that the outer surface of topcoat 707 corresponds to or mirrors the variations in the underlying textures and layers.

Figure 8:
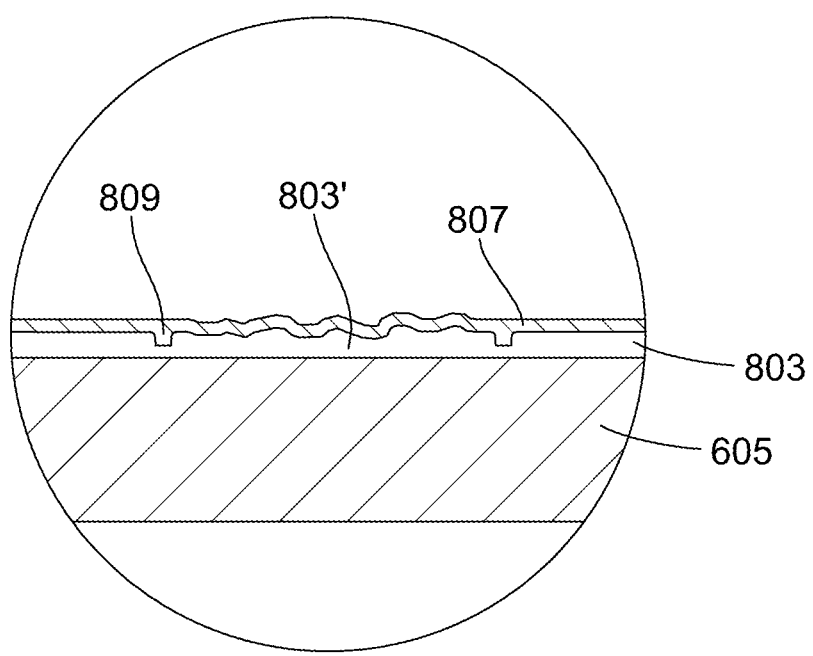
FIG. 8 is a cutaway view of an alternative surface material created by the inventive processes of FIG. 3, such as along the line A-A in FIG. 5.

FIG. 8 is another cutaway view of a surface material created by the inventive processes of FIG. 3, such as along the line A-A in FIG. 5. In FIG. 8, substrate 605 is underneath texture layer(s) 803. In contrast to FIGS. 6-7, texture layer(s) 803 cover the entirety of the substrate 605 and/or depressions 809 do not extend all the way through to expose the substrate 605. In FIG. 8, topcoat 807 may have either an even finish similar to topcoat 607 in FIG. 6 or a varying surface similar to topcoat 707 in FIG. 7, or a combination thereof. As seen in FIG. 8, texture profile 803 may differ from texture 803' and be provided with different topcoat finishes 807. As one example, returning to FIG. 5, tile sections 503, 505, 507 may be provided with the same or different topcoat treatments or finishes, depending on the desired configuration and appearance of the finished end product.

Surface materials manufactured according to the methods herein may have additional benefits in use and application. For example, similar to the arrangement shown in FIG. 5, the surface material may have the appearance of many separate, distinct tiles 503, but actually be formed in a larger sheet or panel 501. Thus, in installing the panel 501, the precise orientations and alignments of the pre-fabricated textures (such as tiles 503) may be maintained. In a traditional installation technique, for example the installation of a subway tile backsplash in a kitchen, each individual tile in the field is individually set. Existing products in the prior art also include a collection of small tiles connected by a flexible mesh, wherein each section of mesh is installed individually. With so many independently placed items, the combination of user error and settling can create alignment problems in the large-scale installation, which may compromise the aesthetic features and/or contribute to quality and/or maintenance problems. By contrast, materials manufactured in accordance with the methods herein may be installed in significantly fewer pieces, or even as one single piece. Taking the example of the subway tile backsplash, a surface material 501 can be manufactured in an appropriate dimension, for example about 12-24" in height and about 10' in length, with the appearance of many subway tiles 503, 505, 507. That single panel can be installed as a backsplash for an entire wall of a kitchen or, depending on the room layout, an entire kitchen. The single panel provides for faster installation with fewer opportunities for installation errors, resulting in an enhanced overall appearance. These same advantages can be realized in other situations where tiled finishes are common, such as (but not limited to) counters, walls or wall coverings, bathrooms, flooring, fireplace surrounds and mantles, or commercial and industrial construction.

The advantages of installation are enhanced in situations where more complicated tiling patterns or designs would be used. For example, in a traditional herringbone pattern, elongated tiles are laid in an interlocking pattern that requires many angled cuts when starting from individual tiles. The same appearance of a herringbone pattern can be manufactured in larger panels according to the methods disclosed herein, saving the labor of preparing and installing the individual tiles.

Similarly, tile patterns with varying inlay patterns can be manufactured according to the methods disclosed herein. In FIG. 5, for example, first sections 503 may have a different appearance from second sections 505. Third sections 507 can be prepared with still different appearances. As shown in FIG. 5, sections 503, 505, and 507 have substantially the same shapes or patterns of shape. However, persons of skill will appreciate that the first, second, and third sections may have different shapes. For example, one row of tiled appearances may have a smaller length or width. It is also contemplated that the sections having different appearances need not be organized in rows, other linear relationships, or even any discernable pattern. Installing mixed tiles or mosaics in a traditional way can be further complicated by the differences in the varying tile types, particularly where the tile types have differing thicknesses (requiring uneven application of mortars or other backing adhesives). Again, imaged surface materials prepared as described herein overcome these and other problems.

Additional embodiments relate to the preparation and decoration of fiber-reinforced panels. Referring again to FIG. 3, a fiberglass-reinforced material may be provided in step 301. For example, composite panels may be composed of a thermoset polyester resin and chopped fiberglass strands. Depending on thickness, such composite materials may be provided in rolls and subjected to fabrication processes 300 in a continuous line. Textures and/or images may be applied in step 303 by printing layers of inks as described previously and, optionally, prior to further surface finishing steps. A resinous gel or topcoat is applied in step 305, followed by curing 307. Similar to FIGS. 6-7, the topcoat on a fiber-reinforced panel may, or may not, reflect or correspond to an underlying surface texture, depending on manufacturing and design choices. Such finished materials are useful in the production or repair of vehicles, for example as wall, roof, or door panels for recreational vehicles. By digitally printing the texture and/or images, including, optionally, the background color(s) (e.g., white, cream, tan, black, etc.), the potential for errors from manual processes common in the prior art, such as painting or decal application, is eliminated. Printing the entirety of the image from one set of inks may reduce problems related to differential weathering or fading common in vehicle panels or other exposed surfaces. Moreover, applying texture/images through printing 303 may provide for more intricate or elaborate designs and images, including (but not limited to) a greater number of color choices. By applying the topcoat 305 after imaging step 303, a consistent surface texture can be provided. Optionally, topcoats may be applied unevenly or selectively in coordination with the underlying image or texture for a particular design choice. Topcoat compositions suitable in the production of fiber-reinforced panels may be similar or different from those used in connection with fabrication of engineered stone products. Preferred topcoats finishes are known in the automotive industry. A finished fiber-reinforced panel as described herein may have an overall thickness of about one-quarter to one-half of an inch thick. The above techniques can also be applied to panel assemblies or laminates, for example two fiber-reinforced panels bonded to and separated by a foam layer, such as a partially-finished wall panel.

The invention claimed is:

1. A method for making a surface material, comprising:
providing a substrate surface;
printing on the substrate surface to provide a texture;
printing one or more inks to color the texture;
curing the inks and the texture;
coating the texture and substrate surface with a topcoat material;
curing the topcoat material to form a coating layer;
wherein the texture comprises a first appearance section and a second appearance section separated by a boundary; and wherein the boundary exposes a portion of the underlying substrate surface that is visible through the cured coating layer and contributes to the appearance of the finished surface material.

2. The method of claim 1, further comprising printing a base image on the substrate surface prior to the step of printing on the substrate surface to provide a texture.

3. The method of claim 1, wherein the substrate surface comprises a fiber-reinforced material.

4. The method of claim 3, comprising printing a background color prior to the step of printing on the substrate surface to provide a texture.

5. The method of claim 3, wherein the substrate surface comprises a vehicle panel assembly comprising the fiber-reinforced material.

6. The method of claim 3, wherein the substrate surface comprises a laminate comprising the fiber-reinforced material.

7. The method of claim 1, wherein the first appearance section and the second appearance section have different appearances.

8. A method for making a surface material, comprising:
providing a fiber-reinforced material;
printing an ink on the fiber-reinforced material to produce an image layer;
coating the image layer and fiber-reinforced material with a topcoat material;
curing the topcoat material to form a coating layer;
wherein the image layer comprises a first appearance section and a second appearance section separated by a boundary; and wherein the boundary exposes a portion of the underlying fiber-reinforced material that is visible through the cured coating layer and contributes to the appearance of the finished surface material.

9. The method of claim 8, comprising curing the ink prior to the step of coating the image layer and fiber-reinforced material with a topcoat material.

10. The method of claim 8, comprising printing a background color on the fiber-reinforced material prior to the step of printing an ink on the fiber-reinforced material to produce an image layer.

11. The method of claim 10, wherein providing a fiber-reinforced material comprises providing a laminate comprising the fiber-reinforced material on a surface of the laminate.

12. The method of claim 10, wherein the fiber-reinforced material is provided on the surface of a vehicle panel assembly.

13. The method of claim 8, wherein curing the topcoat material to form a coating layer comprises applying ultraviolet light.

14. The method of claim 8, wherein providing a fiber-reinforced material comprises modifying the surface of the fiber-reinforced material.

15. The method of claim 14, wherein modifying the surface of the fiber-reinforced material comprises sanding the fiber-reinforced material.

16. A method for making a surface material, comprising:
providing a composite panel;
printing a first ink on the composite panel to produce a texture layer;
printing a second ink to apply an image to the texture layer;
coating the image, texture layer, and composite panel with a topcoat material;
curing the topcoat material to form a coating layer;
wherein the image comprises a first appearance section and a second appearance section separated by a boundary; and wherein the boundary exposes a portion of the underlying composite panel that is visible through the cured coating layer and contributes to the appearance of the finished surface material.

17. The method of claim 16, wherein the first ink and the second ink are substantially the same.

18. The method of claim 16, comprising printing a background color on the composite panel prior to the step of printing a first ink on the composite panel to produce a texture layer.

19. The method of claim 16, comprising printing a third ink to apply an image layer to the boundary that is visible through the cured coating layer and contributes to the appearance of the finished surface material.

20. The method of claim 19, wherein the composite panel is a laminate.

* * * * *